(12) United States Patent
Miller et al.

(10) Patent No.: US 7,431,371 B2
(45) Date of Patent: Oct. 7, 2008

(54) VEHICLE SEAT LATCH

(75) Inventors: Michael P. Miller, South Lyon, MI (US); Brian P. Baibak, Howell, MI (US); Brent C. Everett, Warren, MI (US); Craig S. Smith, Novi, MI (US); Michael A. Blake, Plymouth, MI (US)

(73) Assignee: Porter Group, LLC, Novi, MI (US)

( * ) Notice: Subject to any disclaimer, the term of this patent is extended or adjusted under 35 U.S.C. 154(b) by 401 days.

(21) Appl. No.: 11/386,525

(22) Filed: Mar. 22, 2006

(65) Prior Publication Data

US 2007/0222250 A1 Sep. 27, 2007

(51) Int. Cl.
*B60N 2/08* (2006.01)

(52) U.S. Cl. .................... 296/65.03; 297/336
(58) Field of Classification Search ............... 296/63, 296/65.01, 68.1, 65.03; 297/336; 248/503.1
See application file for complete search history.

(56) References Cited

U.S. PATENT DOCUMENTS

| | | | | |
|---|---|---|---|---|
| 5,482,345 A | * | 1/1996 | Bolsworth et al. | 296/65.03 |
| 6,036,252 A | * | 3/2000 | Hecksel et al. | 296/65.03 |
| 6,820,912 B1 | * | 11/2004 | Lavoie | 296/65.03 |
| 6,945,585 B1 | | 9/2005 | Liu et al. | |
| 7,044,552 B2 | * | 5/2006 | Muller et al. | 297/336 |
| 7,243,974 B2 | * | 7/2007 | Kondo et al. | 296/65.03 |
| 7,296,840 B2 | * | 11/2007 | Martone et al. | 296/65.03 |
| 2005/0218685 A1 | * | 10/2005 | Liu et al. | 296/65.03 |
| 2005/0236862 A1 | * | 10/2005 | Martone et al. | 296/65.03 |
| 2006/0125273 A1 | * | 6/2006 | Lutzka et al. | 296/65.03 |
| 2007/0080554 A1 | * | 4/2007 | Willing et al. | 296/65.03 |
| 2008/0012379 A1 | * | 1/2008 | Miller et al. | 296/65.03 |

\* cited by examiner

*Primary Examiner*—Jason S Morrow
(74) *Attorney, Agent, or Firm*—Brooks Kushman P.C.

(57) ABSTRACT

A vehicle seat latch (24) includes a latch member (40) and a blocking member (70) that each have associated first and second blocking surfaces (80, 82 and 88, 90) for holding the latch member in a latched position with the blocking member in a blocking position. The first blocking surfaces (80 and 88) of the latch member and blocking member have a pressure angle between 4.6 and 6.6 degrees while the second blocking surfaces (82 and 90) have a zero degree pressure angle and are slightly spaced from each other. A deformable blocking portion (84) of the blocking member (70) defines its first blocking surface (88) and is deformed by excessive loading so that the zero degree pressure angle second blocking surfaces (82 and 90) then contact each other to hold the latch member in its latched position.

12 Claims, 3 Drawing Sheets

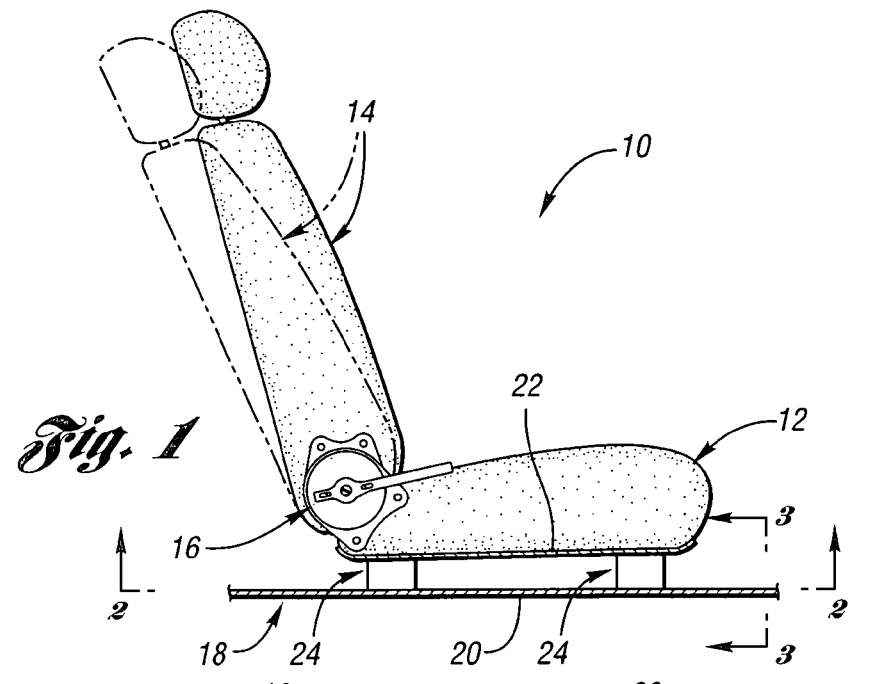
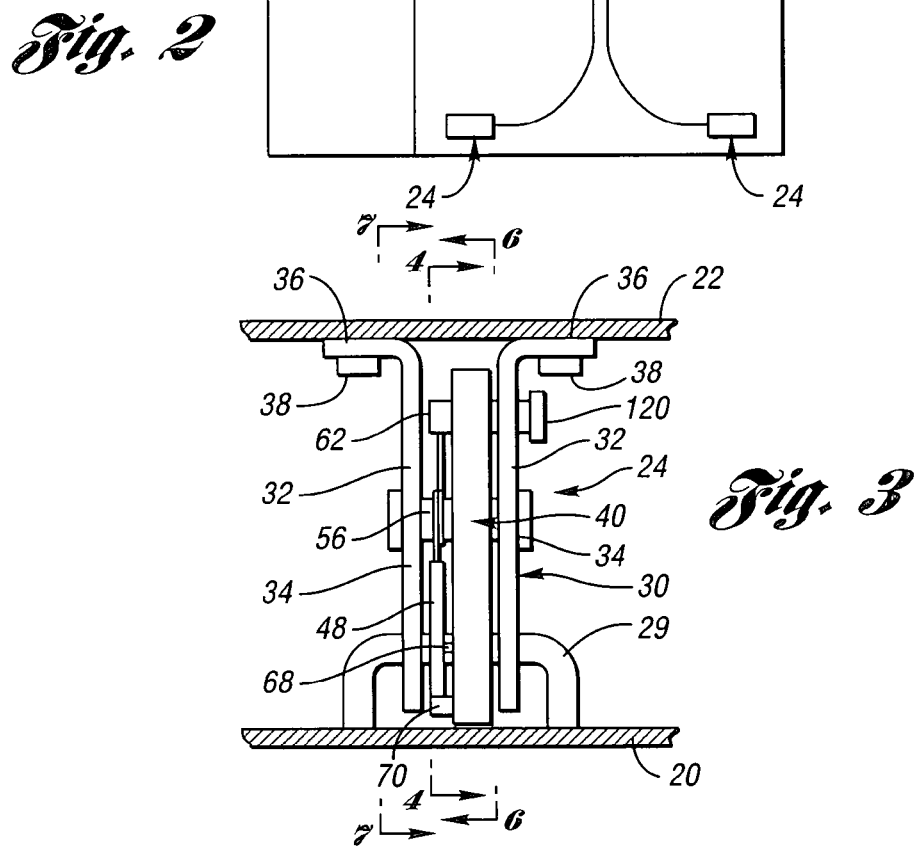

VEHICLE SEAT LATCH

BACKGROUND OF THE INVENTION

1. Field of the Invention

This invention relates to a vehicle seat latch for securing and selectively releasing a vehicle seat with respect to a vehicle body.

2. Background Art

Attachment latches have previously been utilized to secure a vehicle seat with respect to a vehicle body and to selectively permit the seat to be released so that the seat can be moved or stored so as to permit the vehicle to provide a cargo area for transportation as opposed to carrying of passengers. See, for example, U.S. Pat. No. 6,945,585 Liu et al. which is assigned to the assignee of the present invention.

SUMMARY OF THE INVENTION

An object of the present invention is to provide an improved vehicle seat latch for securing and selectively releasing a vehicle seat with respect to a vehicle body.

In carrying out the above object, the vehicle seat latch of the invention includes a latch housing and a latch member that is mounted on the latch housing for movement between latched and unlatched positions with respect to a striker to selectively secure and release a seat with respect to a vehicle body. The latch member includes first and second blocking surfaces, and the latch also includes a blocking member mounted on the latch housing for movement along a blocking direction between blocking and unblocking positions with respect to the latch member. The blocking member has a deformable blocking portion including a first blocking surface for contacting the first blocking surface of the latch member in the blocking position to prevent movement of the latch member from its latched position to its unlatched position. The first blocking surface of the blocking member contacts the first blocking surface of the latch member with a pressure angle between 4.6 and 6.6 degrees with respect to the blocking direction so as to facilitate selective movement of the blocking member from the blocking position to the unblocking position to permit the latch member to move from the latched position to the unlatched position. The deformable portion of the blocking member is deformed by loading from the latch member upon excessive loading between the seat latch and the striker. The blocking member has a rigid blocking portion including a second blocking surface slightly spaced from the second blocking surface of the latch member in the blocking position with a zero degree pressure angle with respect to the blocking direction. A second blocking surface of the rigid blocking portion of the blocking member is contacted by the second blocking surface of the latch member with the zero degree pressure angle upon deformation of the deformable portion of the blocking member upon excessive loading to prevent movement of the blocking member to the unblocking position and to thereby maintain the latch member in the latched position.

The latch includes a first pivotal connection that pivotally mounts the latch member on the latch housing for pivotal movement between the latched and unlatched positions. A second pivotal connection pivotally mounts the blocking member on the latch housing for pivotal movement between the blocking and unblocking positions. The first and second blocking surfaces of the latch member and the first and second blocking surfaces of the blocking member have curved shapes that oppose each other with the latch member in its latched position and the blocking member in its blocking position.

The latch includes an auxiliary member mounted on the latch member and a spring for biasing the auxiliary member into contact with the striker with the latch member in the latched position to ensure contact with the striker and thereby eliminate rattling and other noise. A pair of pin and slot connections mount the auxiliary member on the latch member, and the spring is a torsion spring that extends around the first pivotal connection and mounts the latch member on the latch housing, with the torsion spring having a biasing arm that contacts the auxiliary member and having a locating arm that contacts the latch member.

The latch member includes first and second projections that are spaced from each other and respectively define its first and second curved blocking surfaces.

The deformable blocking portion of the blocking member includes a deformable projection that defines the first curved blocking surface of the blocking member, and the deformable projection of the blocking member in the blocking position is received between the first and second projections of the latch member in the latched position with the first curved blocking surface thereof contacting the first curved blocking surface of the latch member and with the second curved blocking surface of the blocking member spaced slightly from the second curved blocking surface of the latch member. The deformable projection of the blocking member includes an enlarged end and a support portion of a smaller size that supports the enlarged end.

The latch includes an overcenter spring that extends between the housing and the latch member to selectively and alternately bias the latch member to either its latched or unlatched position, and a torsion spring extends between the housing and the blocking member to bias the blocking member to the blocking position.

An actuator moves the blocking member from the blocking position to the unblocking position against the bias of the torsion spring. A connection link has first and second ends including respective connections to the blocking member and the latch member. One of these connections is a pin and slot connection so the blocking member can be moved from its blocking position to its unblocking position under the impetus of the actuator before continued movement moves the latch member from its latched position to its unlatched position under the control of the overcenter spring. More specifically, the pin and slot connection connects the connection link to the blocking member.

The objects, features and advantages of the present invention are readily apparent from the following detailed description of the preferred embodiment when taken in connection with the accompanying drawings.

BRIEF DESCRIPTION OF THE DRAWINGS

FIG. 1 is a side elevational view of a vehicle seat that is secured and selectively released from an associated vehicle body by seat latches constructed in accordance with the present invention.

FIG. 2 is a bottom plan view taken along the direction of line 2-2 in FIG. 1 to illustrate the positioning of the seat latches with respect to the vehicle seat.

FIG. 3 is a somewhat schematic view of one of the latches taken along the direction of line 3-3 in FIG. 1 to illustrate the construction of the seat latch.

DETAILED DESCRIPTION OF THE PREFERRED EMBODIMENT

Figure 4:
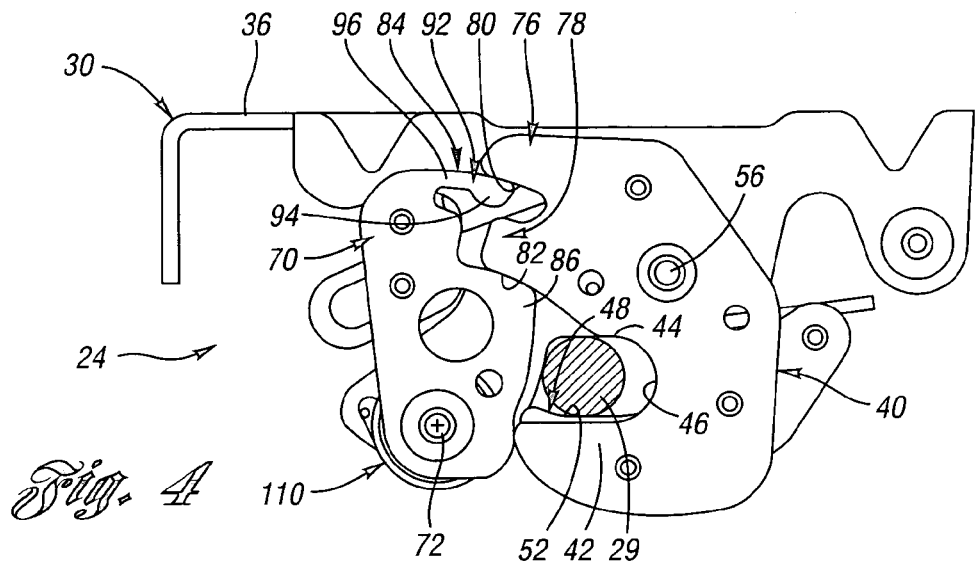
FIG. 4 is a view of the seat latch taken along the direction of line 4-4 in FIG. 3 and is shown with a latch member thereof in a latched position and with a blocking member thereof in a blocking position holding the latch member in its latched position to secure a striker in order to secure the associated vehicle seat with respect to the vehicle body.

With reference to FIG. 1, a vehicle seat generally indicated by 10 includes a seat cushion 12 and a seat back 14 that may be mounted on the cushion 12 by a recliner 16 for reclining movement as illustrated by the solid and phantom line positions. A partially indicated vehicle 18 includes a member 20 which is actually a vehicle floor pan on which the vehicle seat is mounted. The seat cushion 12 of the vehicle seat includes a member 22 which may be a vehicle seat cushion pan or a seat frame member. The seat member 22 is secured and selectively released from the vehicle by vehicle seat latches 24 that are each constructed in accordance with the present invention as is hereinafter more fully described.

With reference to FIG. 2, the vehicle seat 10 is illustrated as having four of the seat latches 24 mounted at the corners of an individual seat. However, it should be appreciated that the latches can also be utilized with a bench type seat for holding two or more passengers and that it is possible to use less or more than the four latches illustrated in providing vehicle seat attachment and selective release with respect to the vehicle body. For example, two of the latches can be utilized in cooperation with the recliner 16 and other seat latches to permit seat folding for storage that provides a cargo floor adjacent the seat within the vehicle, and the latches can also be utilized to remove the seat from the vehicle to provide cargo capacity. As illustrated, a release handle 26 has suitable connections such as the cables 28 illustrated to provide the simultaneous release of all of the latches 24, as is hereinafter more fully described, so as to permit the movement of the seat with respect to the vehicle body.

With reference to FIG. 3, each latch 24 is operable to secure and selectively release a striker 29 mounted on the vehicle body member. The latch 24 includes a latch housing 30 that is mounted on the vehicle seat member 22. While the mounting of the latch housing 30 on the vehicle seat member 22 and the striker 29 on the vehicle body member 20 is the preferred construction, it should be appreciated that it is also possible to reverse the respective positions of these components. However, the mounting of the latch 24 on the vehicle seat member 22 is preferred since upon detachment of the seat, the striker 29 provides less of a projection than the latch. As illustrated, latch housing 30 includes a pair of latch plates 32 each of which includes a flange 34 spaced from the flange of the other latch plate. Each latch plate 32 also includes a securement flange portion 36 that is secured by a suitable fastener 38 to the vehicle seat member 22. As is hereinafter more fully described, most of the components of the latch 24 are mounted between the flanges 34 of the pair of latch plates 32. While it is possible to provide the latch utilizing only a single latch plate, the construction illustrated with a pair of the latch plates is preferred since the components are then better supported and enclosed from each side as opposed to being partially exposed.

Figure 5:
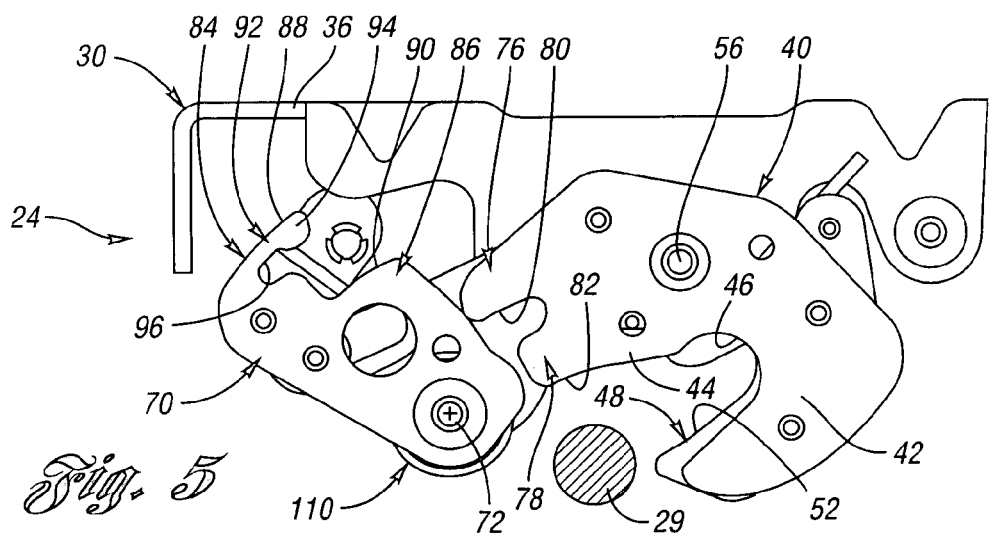
FIG. 5 is a view taken in the same direction as FIG. 4 but showing the blocking member moved to an unblocking position that allows the latch member to move to the illustrated unlatched position to release the striker and the seat from the vehicle body.

As illustrated in FIGS. 4 and 5, the latch 24 includes a latch member 40 that is mounted on the latch housing 32 for movement between the latched position of FIG. 4 and the unlatched position of FIG. 5. This latch member 40 has a bifurcated shape including a pair of locking portions 42 and 44 that cooperate to define a locking notch 46 for receiving the striker 29. In the latched position of FIG. 4, the latch member 40 captures the striker 29 to secure the vehicle seat with respect to the vehicle body. Movement of the latch member 40 to the unlatched position of FIG. 5 as is hereinafter more fully described releases the striker 29 so that the seat can be moved with respect to the vehicle body as previously described.

Figure 6:
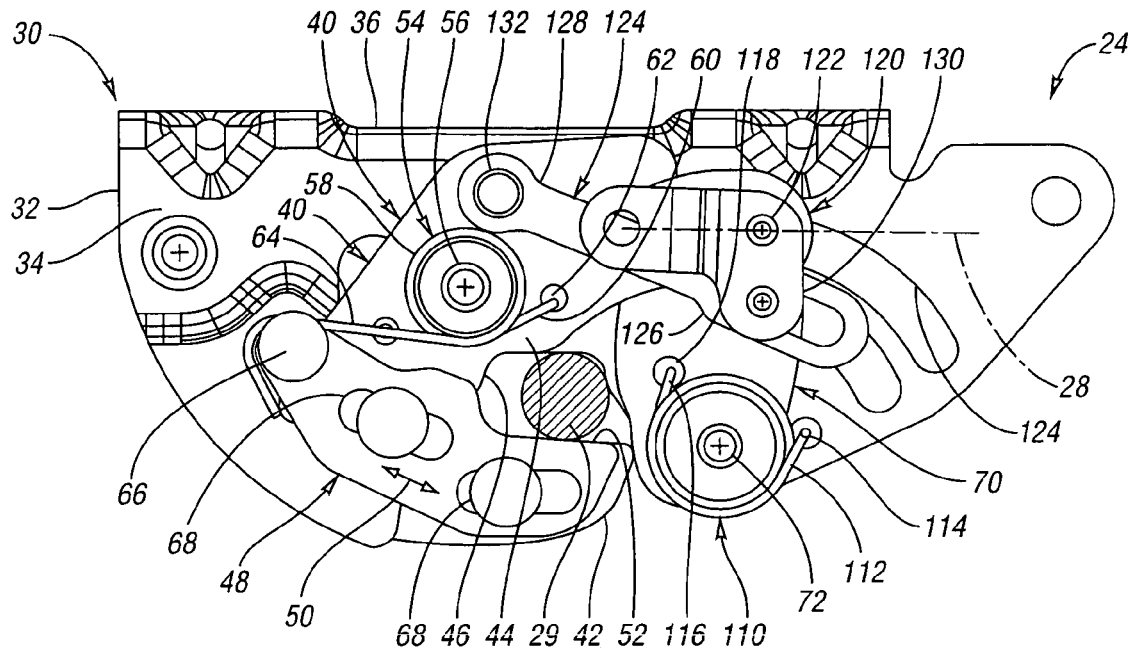
FIG. 6 is a view of the latch taken in the direction of line 6-6 in FIG. 3.
Figure 7:
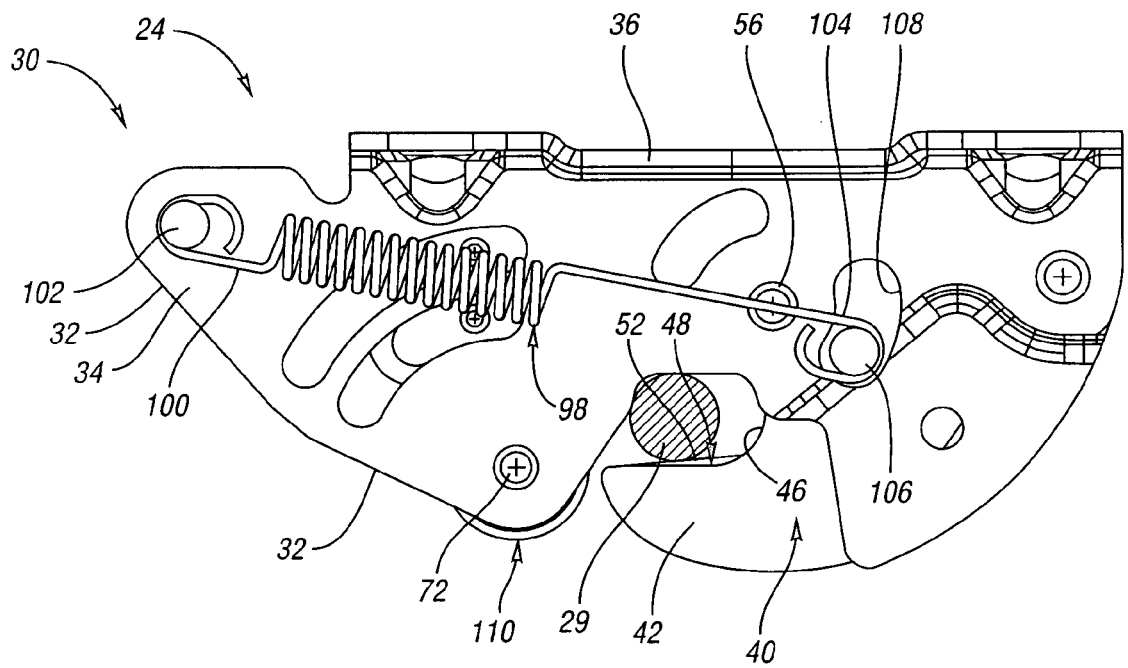
FIG. 7 is a view of the latch taken in the direction of line 7-7 in FIG. 3.

As best shown in FIG. 6, the latch 24 also includes an auxiliary member 48 that is mounted on the latch member 40 for movement therewith and is also mounted for movement with respect to the latch member as illustrated by arrows 50. The auxiliary member 48 has a wedging surface 52 for contacting the striker 29 when the latch member 40 is in its latched position. A resilient bias 54 biases the auxiliary member 48 generally toward the right as illustrated in FIG. 6 (generally toward the left as illustrated in FIG. 7) so that its wedging surface 52 is moved into wedging contact with the striker 29 in the latched position to provide a rattle free attachment of the seat to the vehicle body. With this construction, the rattle free attachment is insured throughout the useful lifetime of the latch.

As illustrated in both FIGS. 4 and 5, the latch member 40 has a pivotal connection 56 provided by a pin that extends between the flanges 34 of the latch plates 32 shown in FIG. 3. This pivotal connection 56 thus mounts the latch member 40 for pivotal movement between its latched position of FIG. 4 where the striker is received within the notch 46 and the unlatched position of FIG. 5 where the striker is released. With the latch member 40 pivotally positioned in its latched position as shown in FIG. 4, the auxiliary member 48 is biased into wedging contact with the striker 29 as mentioned above so as to provide the rattle free attachment.

As also shown in FIG. 6, the resilient bias 54 is constructed as a torsion spring 58 that extends around the pivotal connection 56 of the latch member 40 and has a positioning arm 60 that extends to and secured within a hole 62 in the latch member 40. This torsion spring 58 also has a biasing arm 64 that extends and is secured to a projection 66 on the auxiliary member 48. The spring arms 60 and 64 are biased away from each other to increase the smaller angle therebetween as illustrated in FIG. 6 so that the auxiliary member 48 is biased generally toward the right into the wedging contact with the striker 29 so as to provide the rattle free attachment as previously described. The latch member 40 and auxiliary member 48 include a pair of pin and slot connections 68 that cooperate to mount the auxiliary member 48 for its movement with respect to the latch 40. The pin and slot connections 68 thus limit the extent of the movement as the pins reaches the opposite ends of the slots.

As also shown in FIGS. 4 and 5, the latch includes a blocking member 70 mounted on the flanges 34 of the pair of latch plates 32 for movement between a blocking position shown in FIG. 4 and an unblocking position shown in FIG. 5. More specifically, a pivotal connection 72 supports the blocking member 70 between the latch plate flanges 34 for pivotal movement along a curved blocking direction shown by arrows 74 (FIG. 4*a*) between its blocking and unblocking positions.

Figure 4A:
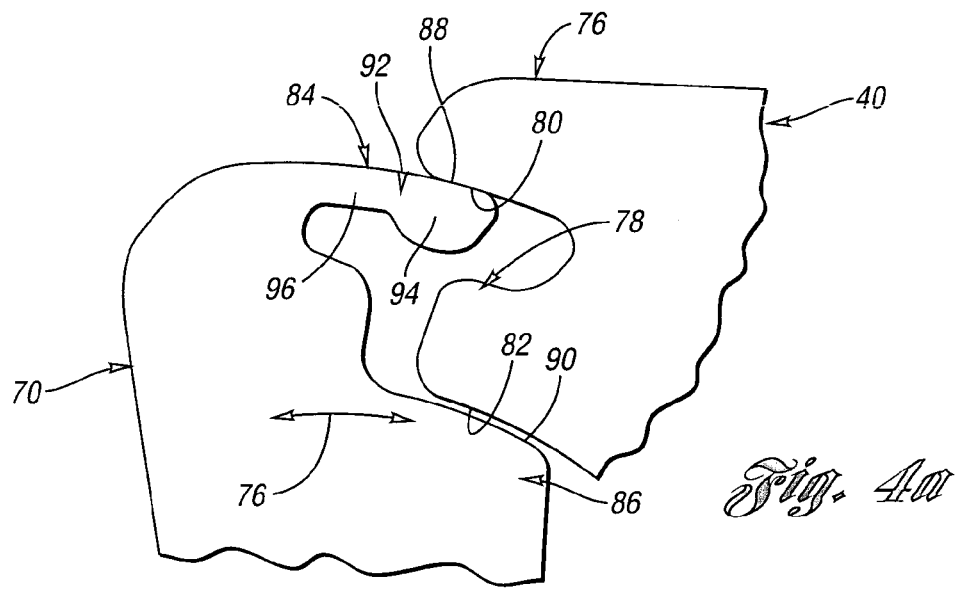
FIG. 4a is an enlarged view of a portion of FIG. 4 illustrating the manner in which first and second blocking surfaces of the latch member cooperate with first and second blocking surfaces of the blocking member.

The latch member 40 as shown in FIGS. 4, 4*a* and 5 includes first and second spaced projections 76 and 78 that respectively define first and second curved blocking surfaces 80 and 82. Furthermore, the blocking member 70 includes a deformable blocking portion 84 and a rigid blocking portion 86 that respectively define first and second curved blocking surfaces 88 and 90.

As shown in FIGS. 4 and 4*a* with the latch member 40 in its latched position, its first curved blocking surface 80 engages the first curved blocking surface 88 of the blocking member 70 to prevent the latch member from moving by counterclockwise rotation to the unlatched position illustrated in FIG. 5. These first curved blocking surfaces 80 and 88 have a pressure angle of between 4.6 and 6.6 degrees with respect to the curved blocking direction shown by arrows 76. This pressure angle facilitates actuated movement, as is hereinafter more fully described, of the blocking member to the unblocking position of FIG. 5 so that the latch member can move to the unlatched position also shown in FIG. 5. More specifically, this pressure angle is optimally 5.6 degrees.

As best illustrated in FIG. 4*a*, the latched position of the latch member has the second curved blocking surface 82 of the latch member 40 and the second curve blocking surface 90 of the blocking member 70 opposing each other in a slightly spaced relationship with a zero degree pressure angle. Thus, both of these curved blocking surfaces 82 and 90 have a radius of curvature whose center is about the pivotal connection 72 of the blocking member. However, the second curved blocking surfaces 82 and 90 of the latch member 40 and the blocking member 70 are slightly spaced from each other, only about ¼ millimeter. Upon excessive loading between the seat and the vehicle body, the deformable blocking portion 84 of the blocking member 70 deforms so the second curved blocking surfaces 82 and 90 of the latch member and the blocking member contact each other with their zero degree pressure angle and prevent movement of the blocking member to its unblocking position so that the latch member is held in its latched position securing the seat.

As best shown in FIG. 4*a*, the deformable blocking portion 84 of the blocking member 70 includes a deformable projection 92 that defines the first curved blocking surface 88 of the blocking member. This deformable projection 92 of the blocking member 70 is received between the first and second projections 76 and 78 of the latch member 40 in the latched position with its first curved blocking surface 88 engaging the first curved blocking surface 80 of the latch member 40 as previously described and with the pressure angle also previously discussed. Such contact, as described above, spaces the second curved blocking surface 82 of the latch member projection 78 from the second curved blocking surface 90 of the rigid blocking portion 76 of the blocking member. The deformable protection 92 includes an enlarged end 94 and a support portion 96 of a smaller size than the enlarged end. The smaller sized support portion 96 supports the enlarged end 94 and is deformable to permit the engagement of the zero pressure angle blocking surfaces 82 and 90 as described above. The blocking member is made from a ductile steel such as SAE050 so the deformable projection deforms under excessive loading.

As illustrated in FIG. 7, the latch 24 includes an overcenter spring 98 having one end 100 connected to a pin 102 on one of the latch plates 32 and having another end 104 that is connected to a pin 106 mounted on the latch member 40 and extending outwardly through a slot 108 in the latch plate 32. During movement of the latch member between the latched and unlatched positions, a straight line between the fixed pin 102 on the latch plate and the movable pin 106 on the latch member moves above and below the pivotal connection 56 of the latch member so that the spring 98 selectively and alternately biases the latch member to either its latched position or unlatched position.

As illustrated in FIG. 6, a torsion spring 110 extends around the pivotal connection 72 that supports the blocking member 70 on the housing for movement between the blocking and unblocking positions as previously described. This torsion spring 110 has a positioning arm 112 secured within a hole 114 in one of the latch plates 32 of the latch housing, and the torsion spring 110 also has a biasing arm 116 secured within a hole 118 of the blocking member 70. The torsion spring 110 acts between the housing 30 and the blocking member 70 to bias the blocking member toward its blocking position of FIG. 4 from its unblocking position of FIG. 5.

When the latch 24 is in the latched position of FIG. 4 securing the striker 29 by the latch member 40 as previously described, an actuator 120 shown in FIG. 7 is operated by the release cable 28 to initiate unlatching of the latch. This actuator 120 includes a pin 122 mounted on the blocking member 70 and extending through a slot 124 in the illustrated latch housing plate 32 so as to be located on the outside of the latch. Cable 28 moves the actuator 120 to rotate the blocking member 70 from its blocking position of FIG. 6 toward its unblocking position of FIG. 5, that is a counterclockwise direction in FIGS. 4 and 5 and a clockwise direction in FIG. 6. A connection link 124 has first and second ends 126 and 128 respectively having first and second connections 130 and 132 to the blocking member 70 and the latch member 40. The first connection 130 of the first connection link end 126 to the blocking member 70 is a pin and slot connection such that the initial movement of the blocking member against the bias of its torsion spring 120 from the blocking position of FIG. 4 toward the unblocking position of FIG. 5 does not move the latch member 40. During this unlocking actuation, the deformable blocking portion 84 of the blocking member 70 rotates counterclockwise until the first curved blocking surfaces 80 and 88 slide out of engagement with each other, and the first connection 130 then begins to move the latch member 40 against its overcenter spring bias from the latched position of FIG. 4 toward the unlatched position of FIG. 5 in which the latch is then held by the overcenter spring bias and engagement of the first latch member projection 76 with the blocking member as shown in FIG. 5.

When the seat is reattached to the cushion 12, downward movement of the latch 24 contacts the striker 29 with the lower side of the latch member second projection 78 to pivot the latch member 40 clockwise as shown in FIG. 5 about its pivotal connection 56 and move the overcenter spring to move the latch member to its latched position of FIG. 4 as the torsion spring 110 of the blocking member 70 moves the blocking member back into the blocking position previously described.

While the preferred construction of the vehicle seat latch has been described in detail, those familiar with the art to which this invention relates will recognize various alternative designs and embodiments for practicing the invention as defined by the following claims.

What is claimed is:

1. A vehicle seat latch comprising:
 a latch housing;
 a latch member mounted on the latch housing for movement between latched and unlatched positions with respect to a striker to selectively secure the latch housing with respect to the striker, and the latch member having first and second blocking surfaces;

a blocking member mounted on the latch housing for movement along a blocking direction between blocking and unblocking positions with respect to the latch member;

the blocking member having a deformable blocking portion including a first blocking surface for contacting the first blocking surface of the latch member in the blocking position to prevent movement of the latch member from its latched position to its unlatched position, the first blocking surface of the blocking member contacting the first blocking surface of the latch member with a pressure angle between 4.6 and 6.6 degrees with respect to the blocking direction so as to facilitate selective movement of the blocking member from the blocking position to the unblocking position to permit the latch member to move from the latched position to the unlatched position, and the deformable portion of the blocking member being deformed by loading from the latch member upon excessive loading between the seat latch and the striker; and the blocking member having a rigid blocking portion including a second blocking surface slightly spaced from the second blocking surface of the latch member in the blocking position with a zero degree pressure angle with respect to the blocking direction, and second blocking surface of the rigid blocking portion of the blocking member being contacted by the second blocking surface of the latch member with the zero degree pressure angle upon deformation of the deformable portion of the blocking member upon excessive loading to prevent movement of the blocking member to the unblocking position and to thereby maintain the latch member in the latched position.

2. A vehicle seat latch as in claim 1 further including a first pivotal connection that pivotally mounts the latch member on the latch housing for pivotal movement between the latched and unlatched positions, a second pivotal connection that pivotally mounts the blocking member on the latch housing for pivotal movement between the blocking and unblocking positions, and the first and second blocking surfaces of the latch member and the first and second blocking surfaces of the blocking member having curved shapes.

3. A vehicle seat latch as in claim 2 further including an auxiliary member mounted on the latch member and a spring for biasing the auxiliary member into contact with the striker with the latch member in the latched position to ensure contact with the striker.

4. A vehicle seat latch as in claim 3 further including a pair of pin and slot connections that mount the auxiliary member on the latch member, the spring being a torsion spring that extends around the first pivotal connection that mounts the latch member on the latch housing, and the torsion spring having a biasing arm that contacts the auxiliary member and also having a locating arm that contacts the latch member.

5. A vehicle seat latch as in claim 2 wherein the latch member includes first and second projections that are spaced from each other and respectively define the first and second curved blocking surfaces of the latch member.

6. A vehicle seat latch as in claim 5 wherein the deformable blocking portion of the blocking member includes a deformable projection that defines the first curved blocking surface of the blocking member, and the deformable projection of the blocking member in the blocking position being received between the first and second projections of the latch member in the latched position with the first curved blocking surface thereof contacting the first curved blocking surface of the latch member and with the second curved blocking surface of the blocking member spaced slightly from the second curved blocking surface of the latch member.

7. A vehicle seat latch as in claim 6 wherein the deformable projection of the blocking member includes an enlarged end and a support portion of a smaller size that supports the enlarged end.

8. A vehicle seat latch as in claim 2 further including an overcenter spring that extends between the housing and the latch member to selectively and alternately bias the latch member to either its latched or unlatched position, and a torsion spring that extends between the housing and the blocking member to bias the blocking member to the blocking position.

9. A vehicle seat latch as in claim 8 further including an actuator that moves the blocking member from the blocking position to the unblocking position against the bias of the torsion spring, a connection link including first and second ends having respective connections to the blocking member and the latch member, and one of the connections of the connection link being a pin and slot connection so the blocking member can be moved from its blocking position to its unblocking position under the impetus of the actuator before continued movement moves the latch member from its latched position to its unlatched position under the control of the overcenter spring.

10. A vehicle seat latch as in claim 9 wherein the pin and slot connection connects the connection link to the blocking member.

11. A vehicle seat latch comprising:

a latch housing;

a latch member pivotally mounted on the latch housing for movement between latched and unlatched positions with respect to a striker to selectively secure the latch housing with respect to the striker, the latch member having first and second curved blocking surfaces, and an overcenter spring that extends between the housing and the latch member to selectively and alternately bias the latch member to the latched or unlatched position;

a blocking member pivotally mounted on the latch housing for rotation along a blocking direction between blocking and unblocking positions with respect to the latch member;

the blocking member having a deformable blocking portion including a first curved blocking surface for contacting the first curved blocking surface of the latch member in the blocking position to prevent movement of the latch member from its latched position to its unlatched position, the first curved blocking surface of the blocking member contacting the first curved blocking surface of the latch member with a pressure angle between 4.6 and 6.6 degrees with respect to the blocking direction to facilitate selective movement of the blocking member from the blocking position to the unblocking position to permit the latch member to move from the latched position to the unlatched position, and the deformable portion of the blocking member being deformed by loading from the latch member upon excessive loading between the seat latch and the striker;

the blocking member having a rigid blocking portion including a second curved blocking surface slightly spaced from the second curved blocking surface of the latch member in the blocking position with a zero degree pressure angle with respect to the blocking direction, and second curved blocking surface of the rigid blocking portion of the blocking member being contacted with the zero degree pressure angle by the second curved blocking surface of the latch member upon deformation of the deformable portion of the blocking member upon excessive loading to prevent movement of the blocking member to the unblocking position and to thereby maintain the latch member in the latched position; and an actuator that moves the blocking member from the blocking position to the unblocking position against the bias of the torsion spring, a connection link including first and second ends having respective connections to the blocking member and the latch member, and one of the connections of the connection link being a pin and slot connection so the blocking member can be moved from its blocking position to its unblocking position under the impetus of the actuator before continued movement moves the latch member from its latched position to its unlatched position under the control of the overcenter spring.

12. A vehicle seat latch comprising:

a latch housing;

a latch member pivotally mounted on the latch housing for movement between latched and unlatched positions with respect to a striker to selectively secure the latch housing with respect to the striker, the latch member having first and second spaced projections that respectively define first and second curved blocking surfaces, and an overcenter spring that extends between the housing and the latch member to selectively and alternately bias the latch member to the latched or unlatched position;

an auxiliary member, a pair of pin and slot connections that mount the auxiliary member on the latch member, and a spring for biasing the auxiliary member into contact with the striker with the latch member in the latched position to ensure contact with the striker;

a blocking member pivotally mounted on the latch housing for rotation along a blocking direction between blocking and unblocking positions with respect to the latch member;

the blocking member having a deformable blocking portion including a deformable projection having a first curved blocking surface, the deformable projection of the deformable blocking portion of the blocking member in the blocking position being received between the first and second projections of the latch member in the latched position with the first curved blocking surface of the deformable projection contacting the first curved blocking surface of the latch member to prevent movement of the latch member from its latched position to its unlatched position, the first curved blocking surface of the deformable projection of the blocking member contacting the first curved blocking surface of the first projection of the latch member with a pressure angle between 4.6 and 6.6 degrees with respect to the blocking direction to facilitate selectively movement of the blocking member from the blocking position to the unblocking position to permit the latch member to move from the latched position to the unlatched position, and the deformable projection of the deformable portion of the blocking member being deformed by loading from the latch member upon excessive loading between the seat latch and the striker;

the blocking member having a rigid blocking portion including a second curved blocking surface slightly spaced from the second curved blocking surface of second projection of the latch member in the blocking position with a zero degree pressure angle with respect to the blocking direction, and second curved blocking surface of the rigid blocking portion of the blocking member being contacted with the zero degree pressure angle by the second curved blocking surface of the latch member upon deformation of the projection of the deformable projection of the deformable portion of the blocking member upon excessive loading to prevent movement of the blocking member to the unblocking position and to thereby maintain the latch member in the latched position; and an actuator that moves the blocking member from the blocking position to the unblocking position against the bias of the torsion spring, a connection link having a first pin and connection to the blocking member and a second connection to the latch member, and the pin and slot connection permitting the blocking member to be moved from its blocking position to its unblocking position under the impetus of the actuator before continued movement moves the latch member from its latched position to its unlatched position under the control of the overcenter spring.

* * * * *